United States Patent
Warrier et al.

(10) Patent No.: US 6,707,809 B1
(45) Date of Patent: Mar. 16, 2004

(54) METHOD FOR FORWARDING DATA TO IDLE MOBILE NODES, AND HOME AGENT CONTROL NODE FOR USE IN THE METHOD

(75) Inventors: Chandra Warrier, Schaumburg, IL (US); Yingchun Xu, Buffalo Grove, IL (US); Dale Eliason, Lake Zurich, IL (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/496,295

(22) Filed: Feb. 1, 2000

Related U.S. Application Data

(63) Continuation-in-part of application No. 09/354,659, filed on Jul. 16, 1999, which is a continuation-in-part of application No. 09/248,617, filed on Feb. 25, 1999, now Pat. No. 6,560,217.

(51) Int. Cl.[7] .............................................. H04L 12/66
(52) U.S. Cl. ........................................ 370/351; 370/328
(58) Field of Search ................................. 370/351, 328, 370/356, 443; 455/426, 426.1, 435.1, 419

(56) References Cited

U.S. PATENT DOCUMENTS

| | | | | |
|---|---|---|---|---|
| 5,305,466 A | * | 4/1994 | Taketsugu | 455/435.1 |
| 5,442,633 A | | 8/1995 | Perkins et al. | |
| 5,577,105 A | | 11/1996 | Baum et al. | |
| 5,625,884 A | * | 4/1997 | Gitlin et al. | 455/426.1 |
| 5,793,762 A | | 8/1998 | Penners et al. | 370/389 |
| 5,898,780 A | | 4/1999 | Liu et al. | 380/25 |
| 5,910,946 A | | 6/1999 | Csapo | 370/328 |
| 5,920,699 A | | 7/1999 | Bare | 395/200.55 |
| 6,018,657 A | | 1/2000 | Kennedy, III et al. | 455/426 |
| 6,065,120 A | | 5/2000 | Laursen et al. | 713/201 |
| 6,070,243 A | | 5/2000 | See et al. | 713/201 |
| 6,115,390 A | | 9/2000 | Chuah | 370/443 |
| 6,161,008 A | | 12/2000 | Lee et al. | 455/414 |
| 6,195,546 B1 | * | 2/2001 | Leung et al. | 455/419 |
| 6,272,129 B1 | | 8/2001 | Dynarski et al. | 370/356 |
| 6,466,571 B1 | | 10/2002 | Dynarski et al. | 370/352 |
| 6,560,217 B1 | * | 5/2003 | Peirce, Jr. et al. | 370/351 |

FOREIGN PATENT DOCUMENTS

| | | |
|---|---|---|
| EP | 0687118 | 12/1995 |
| WO | WO9832301 | 7/1998 |
| WO | WO9901969 | 1/1999 |

OTHER PUBLICATIONS

C. Perkins, Request for Comments (RFC) 2002, (Oct., 1996).

Charles E. Perkins, Mobile IP Design Principles and Practices, Addison–Wesley Wireless Communications Series, pp. 55–127 (1998).

* cited by examiner

Primary Examiner—Salvatore Cangialosi
(74) Attorney, Agent, or Firm—McDonnell Behnen Hulbert & Brghoff

(57) ABSTRACT

Method for forwarding data from a source of the data to a mobile wireless node, such as a portable computing device, that undergoes a transition to an idle state. A home agent receives the data from the source. The home agent determines that there is no current or active mobility binding record for the mobile node, so it sends a data indication message to a home agent control node. The home agent control node looks up the mobile node in an idle mobility binding record database and identifies the last foreign agent that the idle mobile node was connected to. The home agent control node sends a page request to the identified foreign agent. If the mobile node responds to the page within a predetermined period of time, it will establish a connection with the foreign agent. Data is tunneled from the home agent to the foreign agent for delivery to the mobile node. If the mobile node does not answer the page within the time limit (such as in the case where the power to the mobile node has been turned off), the home agent queues some of the data for transmission to the mobile node when it connects later on, and drops the rest.

15 Claims, 5 Drawing Sheets

FIG. 5

| IMSI # | HOME NETWORK IP ADDRESS | FOREIGN AGENT IP ADDRESS | USERNAME | STATUS |
| --- | --- | --- | --- | --- |
| NOK146297113 | $X_1.X_2.X_3.4$ | $Y_1.Y_2.Y_3.2$ | JOESMITH | IDLE |
| ERI317498820 | $X_3.X_4.X_5.6$ | $Y_3.Y_4.Y_7.8$ | MARYJONES | IDLE |
| MOT8771003215 | $X_6.X_7.X_8.3$ | $Y_2.Y_8.Y_4.3$ | BOB P. | IDLE |
| QUA501103664 | $X_3.X_8.X_9.3$ | $Y_8.Y_7.Y_2.6$ | HARRY T. | ACTIVE |

METHOD FOR FORWARDING DATA TO IDLE MOBILE NODES, AND HOME AGENT CONTROL NODE FOR USE IN THE METHOD

CROSS-REFERENCE TO RELATED APPLICATION

This is a continuation-in-part of the application of Yingchun Xu, et al., MOBILE INTERNET PROTOCOL (IP) NETWORKING WITH HOME AGENT AND/OR FOREIGN AGENT FUNCTIONS DISTRIBUTED AMONG MULTIPLE DEVICES, Ser. No. 09/354,659 filed Jul. 16, 1999, the entire contents of which are incorporated by reference herein, which is a CIP of Ser. No. 09/248,617 filed Feb. 25, 1999 now U.S. Pat. No. 6,560,217.

BACKGROUND OF THE INVENTION

A. Field of the Invention

This invention relates to the subject of mobile Internet Protocol ("IP") data networking.

B. Description of Related Art

Public packet switched networks can be used to carry traffic to and from a mobile communications device, such as a laptop computer or personal digital assistant equipped with a cellular telephone modem. The basic architecture of mobile IP data networking is known in the art and described in several publications, including the Request for Comments document RFC 2002 (1996) and in the textbook of Charles E. Perkins, *Mobile IP Design Principles and Practices*, Addison-Wesley Wireless Communications Series (1998), both of which are fully incorporated by reference herein. Persons skilled in the art of mobile IP data networking are familiar with the contents of both of these documents and the devices used to implement mobile IP data networking in practice.

Basically, and with reference to FIG. 1, in Mobile IP communication, a wireless mobile node 10 communicates with a target host 12 on an IP network 14 by means of two devices, a "foreign agent" 16 and a "home agent" 18. Typically, foreign agent functionality is incorporated into a router or network access server chassis located on a mobile node's visited network 20. A radio access network linking the mobile node to the foreign agent 16 is not shown for purposes of simplicity in the present discussion. The foreign agent 16 provides routing services for the mobile node while it is registered with the home agent 18. The foreign agent 16 de-tunnels and delivers datagrams to the mobile node 10 that were tunneled by the mobile node's home agent 18. In the present specification, the term "tunneling" refers to packet re-addressing, such as performed by the home agent.

The traffic exchanged between the foreign agent 16 and the home agent 18 includes control traffic 22, e.g., registration request and registration reply messages and session control messages, and data traffic 24. The control traffic 22 terminates at the home agent. The data traffic 24 is routed from the mobile node's home network 26 to a second network 14 for delivery to the target host. The target host could be connected to the home network by any arbitrary number of intermediate IP networks, or could be on the mobile node's home network 26.

The home agent 18 is typically implemented in a router on a mobile node's home network 26. The home agent maintains current location information for the mobile node, through a variety of possible mechanisms, such as described in the patent application of Richard J. Dynarski, et al., "Dynamic Allocation of Wireless Mobile Nodes Over an Internet Protocol (IP) Network", Ser. No. 09/233,381, which is incorporated by reference herein. When one or more home agents are handling calls for multiple mobile nodes simultaneously, the home agent(s) are providing, in essence, a service analogous to virtual private network services. Each mobile node is typically associated with a separate home network and the routing path from that home network, through the home agent, to the foreign agent and mobile node is like a virtual private network for the mobile node.

Thus, from the above discussion, it can be seen that the home agent performs two separate and distinct tasks for the foreign agent and mobile node. First, the home agent 18 must perform an authentication and registration process to determine whether the mobile node is authorized to access the home network 26. This may involve checking the identification of the mobile node (such as, through use of the mobile node's unique serial number or manufacturing number), password authentication, and possibly checking that the mobile node's account is current and paid in full. The home agent registration and authentication functions may be performed in conjunction with, or with the assistance of, a second device, such as an authentication, authorization and accounting server such as a RADIUS server. See the patent application of Yingchun Xu, Ser. No. 08/887,313 filed Jul. 3, 1997 for further details.

Second, the home agent 18 has to tunnel data from the target host to the foreign agent, and provide tunneling services in the reverse direction, i.e., provide packet re-addressing for traffic from the foreign agent to the host 12. To coordinate tunneling in the reverse direction, the home agent provides a forwarding "care/of" address to the foreign agent to tell the foreign agent 16 where to tunnel traffic from the mobile node so that it can be sent to the host. This forwarding address is typically contained in a registration reply message sent to the foreign agent notifying the foreign agent that the mobile node is authenticated to communicate in the home network. In the prior art, the home agent is also the device that receives the tunneled traffic from the foreign agent for routing onto the home network, and therefore the forwarding address is the home agent's IP address.

The foreign agent also has to perform two distinct tasks for the mobile node, similar to that of the home agent. First, the foreign agent has to handle the registration and session control aspects for the mobile node, including sending registration request messages to the home agent and processing a registration reply message. Second, the foreign agent has tunneling responsibilities for forwarding data packets to the home agent for ultimate distribution to the destination, and de-tunneling data from the home agent and forwarding the data to the mobile node.

Information regarding active mobile nodes, such as the home agent IP address, the foreign agent care of address, and information uniquely identifying the mobile node (such as the serial number or International Mobile Subscriber Identity (IMSI)) number are stored in memory in the form of a mobility binding record. Mobility binding records are maintained by the foreign agent for the mobile nodes that it has established connections with, and by home agents for currently registered and active mobile nodes belonging to the home agent.

The patent application of Yingchun Xu, et al., entitled MOBILE INTERNET PROTOCOL (IP) NETWORKING WITH HOME AGENT AND/OR FOREIGN AGENT FUNCTIONS DISTRIBUTED AMONG MULTIPLE DEVICES, Ser. No. 09/354,659 filed Jul. 16, 1999, describes a mobile IP system in which the functions of the home agent are divided between two separate devices: a home registration agent (e.g., router) performing the registration functions of a home agent, and a home tunneling agent (e.g., another router) which performs the tunneling function. The Xu et al. '659 application is also fully incorporated by reference herein.

The situation may arise in which a source of data has data to send to a mobile node and thus initiates the communication with the mobile node. If the mobile node subscribes to the Wireless Application Protocol (WAP) push service, it receives IP data from the network. However, once the mobile station transitions to an idle state and disconnects itself from the foreign agent and the network, data cannot be forwarded (i.e. "pushed", as the term is known in the art) from a WAP server. The reason is that, using known prior art techniques, there is no longer information about the mobile node available anywhere in the network. More specifically, when the mobile station transitions to an idle state and disconnects, the mobility binding record for the mobile node stored in the home agent, for example, is deleted.

The present invention overcomes this problem and provides a method and system by which "push" service for mobile nodes can be implemented for mobile nodes that have undergone a transition to an idle state. As such, it represents a substantial improvement in wireless networking.

SUMMARY OF THE INVENTION

In a first aspect, a method is provided for forwarding data from a source of the data to an idle mobile node. The method is performed in a wireless networking system having a home agent for the mobile node and a foreign agent. Data originating from the source is transmitted along one or more intermediate networks to a home agent for the mobile node. A foreign agent with which the mobile node last initiated a connection is then identified. In a preferred embodiment, this step is performed by reference to an mobility binding record database, which contains records for a plurality of idle mobile wireless nodes and associates each of the nodes in the database with the last foreign agent the mobile node was connected to. When the foreign agent is identified, a page request is transmitted to the foreign agent. The foreign agent responsively initiates a page of the mobile node via a wireless network. The mobile node responds to the page by dialing in to the foreign agent and proceeds with a registration process. As such, the mobile node changes state from an idle state to an active state.

When the mobile node has been registered with the home agent and foreign agent, an address associated with the foreign agent is transmitted to the home agent. The address allows the home agent to tunnel the data it received from the source of data to the foreign agent using mobile IP principles described in RFC 2002. Thus, the home agent forwards the data to the foreign agent for transmission to the mobile node.

In the event that the mobile does not respond to the page within a specified period of time (usually due to the mobile being in a power off state), the push service is deemed to have been unsuccessful. The home agent will queue some or all of the data it has to forward to the mobile node for transmission the next time the mobile node connects to the network. If only some portion of the data is queued, the rest of the data is deleted.

The mobility binding record database associates unique information identifying the idle mobile node with the foreign agent with which the mobile node last initiated a connection. The unique information be an International Mobile Subscriber Identity (IMSI) number. The record for the mobile node will also preferably include a home Internet Protocol (IP) address, and a user name, as well as the IP address of the last foreign agent with which the idle mobile node established a PPP connection.

In another aspect of the invention, a home agent control node functioning as a home registration agent is used in the method. The home agent control node can be a general purpose computing device, router, or other element of a communications network that performs the simple functions described herein. For example, the home agent control node may contain a software program causing it to perform registration functions for the mobile node in accordance with RFC 2002 (either alone or perhaps with the assistance of an Accounting Authentication and Authorization server, such as a RADIUS server). Further, the home agent control node may contain the mobility binding record database and perform the function of identifying the last foreign agent connected to the idle mobile node based on the mobile node's IMSI number. In the preferred embodiment, the home agent control node maintains a mobility binding record for all mobiles, both active and inactive, and does not delete the mobility binding records when the mobiles become inactive. It maintains in the database the IMSI number of the mobile, its home IP address, and the IP address of the last foreign agent that the mobile node was connected to.

When the home agent receives the data from the source (e.g., WAP push server), it checks in its mobility binding record to see if the mobile node is currently registered and active. When it determines that the mobile is inactive, the home agent sends a received data indication message to the home agent control node. Upon receipt of a received data indication message, the home agent control node responsively refers to the mobility binding record for idle mobile nodes to identify the foreign agent with which the idle mobile node last initiated a connection. The home agent control node sends a paging request message to the identified foreign agent to cause it to page the mobile node. When the mobile node responds to the page it reestablishes a connection with said foreign agent and, after registration, may receive the data from the home agent using known mobile IP tunneling techniques.

In still another aspect, we have invented a computer-readable storage medium that stores a mobility binding record database for multiple mobile nodes that have undergone a transition to an idle state. The database comprises a plurality of records associated with a plurality of idle mobile nodes. Each of the records comprises fields containing: (1) information uniquely identifying a idle mobile node, such as the mobile nodes IMSI or ESN (Electronic Serial Number) number; (2) a home Internet Protocol address for the idle mobile node; and (3) an address of a foreign agent with which the idle mobile node was last connected. The foreign agent addresses are updated as the mobile node moves in the wireless network and reestablishes connections with new foreign agents, as described in further below. The utility of the database is that it can be stored in and implemented by a home agent or home agent control node to identify a foreign agent which should page the mobile node and thereby initiate a push to idle type of service. In a preferred embodiment, the record for the mobile nodes further includes a user name. The user name facilitates identification of different user sessions that might have been initiated by the same mobile node.

These and other features of the invention will be explained further in the following description of a presently preferred implementation of the invention.

BRIEF DESCRIPTION OF THE DRAWINGS

FIG. 5 is an illustration of several records of a mobility binding database for mobile nodes maintained by the home agent control node of FIG. 2 in the illustrated embodiment.

DETAILED DESCRIPTION OF THE PREFERRED EMBODIMENT OF THE INVENTION

Overview of Representative Network System for Mobile IP Nodes

Figure 1:
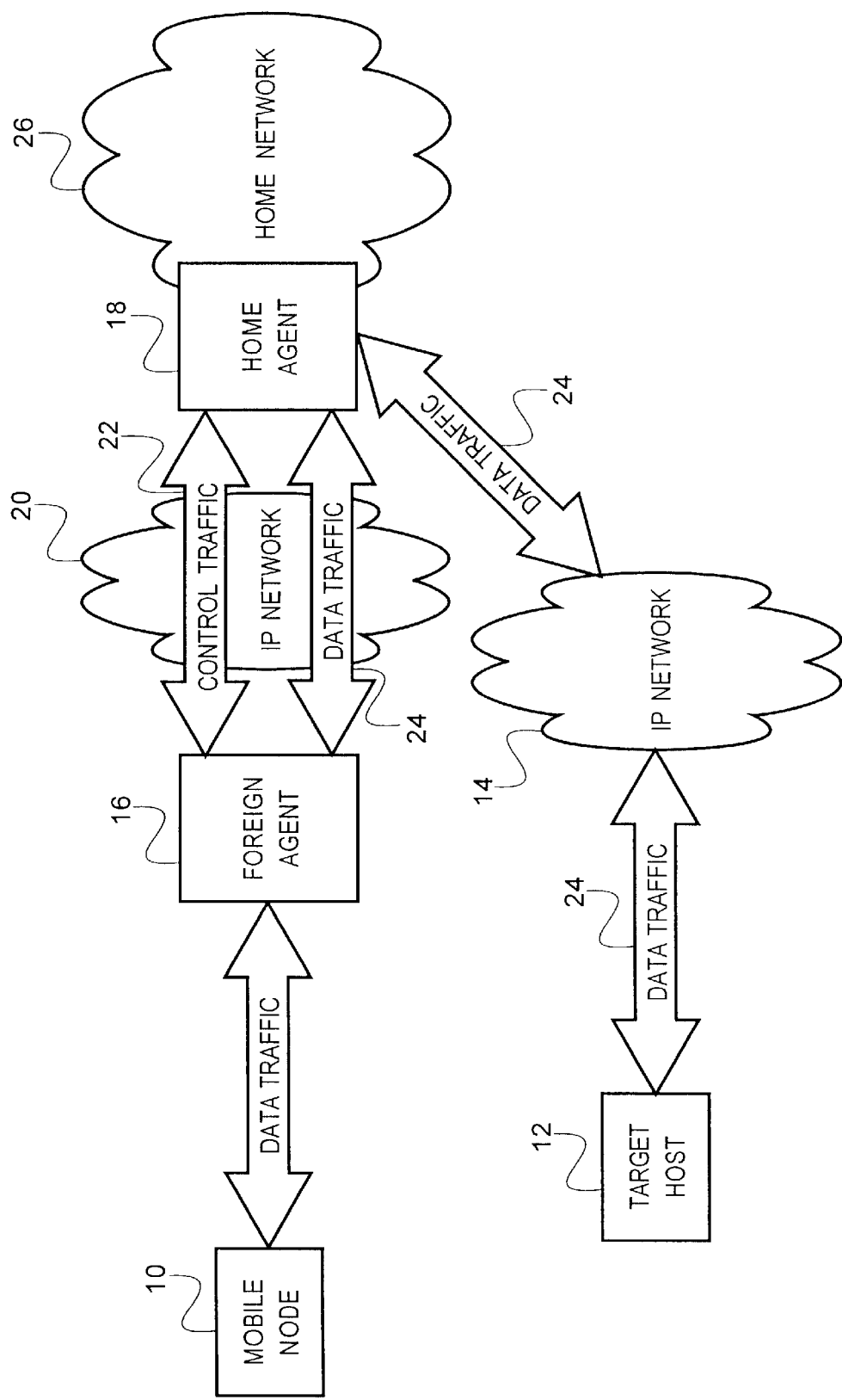
FIG. 1 is a schematic diagram showing one possible system for providing mobile IP networking services for wireless nodes, showing the relationship between the mobile node, foreign agent, home agent control node and a home agent receiving data from a source of data connected to a packet switched network.
Figure 2:
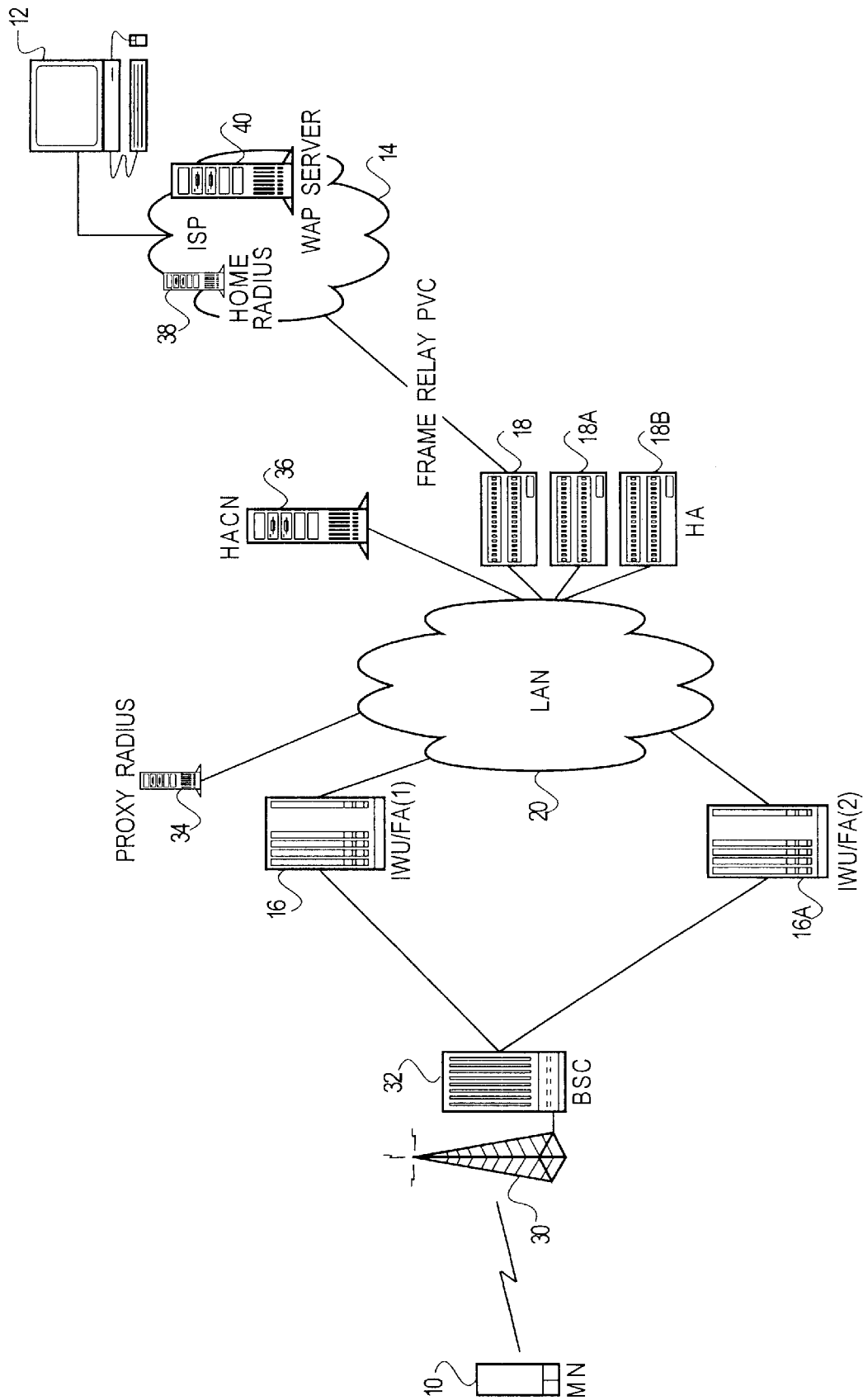
FIG. 2 is another schematic diagram showing a mobile IP networking system, showing a home agent control node used in a preferred embodiment of the invention. The home agent control node comprises a router, server or other network device that handles registration functions for a home agent and maintains a mobility binding record for idle mobile nodes, as described herein.

Referring now to FIG. 2, a mobile IP networking environment in which the invention may be practiced is illustrated. Wireless node 10 communicates with target host computer 12 via a wireless network 30, and a wireless network base station controller (BSC) 30 that is connected with one or more InterWorking Units/Foreign agents 16 and 16A (abbreviated IWU/FA in the illustration). The foreign agent 16 makes a PPP connection with the mobile node via the wireless network and BSC 32. On the network side, the foreign agent has an interface to a packet switched IP network 20. The network 20 is coupled to a proxy RADIUS server 34 used in accounting and authentication of the mobile node, as described in the above-referenced patent applications of Xu et al. The system further concludes a home agent control node 36 which performs home agent registration functions and maintains an idle mobility binding record database, as described in more detail herein. The home agent control node 36 may take any convenient form. A router or a general-purpose computer could perform the home agent control node functionality described herein.

The system further includes a plurality of home agents 18, 18A and 18B. Typically, these home agents will be maintained on a network, such as a home agent service provider network. One home agent will be usually assigned to its own home network, such as network 14 in FIG. 2. Home network 14 in this example is an Internet service provider network containing a home network RADIUS accounting server 38 and a WAP push server 40. In this instance the host computer 12 is connected to the Internet service provider network 14 by a conventional public switched telephone network.

In FIG. 2, the home agent 18 performs tunneling functions for the mobile node in accordance with RFC 2002. It forwards packets of data from the WAP server and source computer 12 to the foreign agent 16 for transmission over the PPP connection to the mobile node 10.

When the mobile node 10 is a subscriber to Wireless Application Protocol "push" service, it is supposed to receive IP data from the networks 20/14. However, once a mobile station goes idle and disconnects from the IP data network 20/14, data cannot be pushed to it form the WAP server 40 in accordance with prior art techniques. The reason is that there is no information about the mobile node available anywhere in the data network. The present invention addresses this problem.

Figure 3:
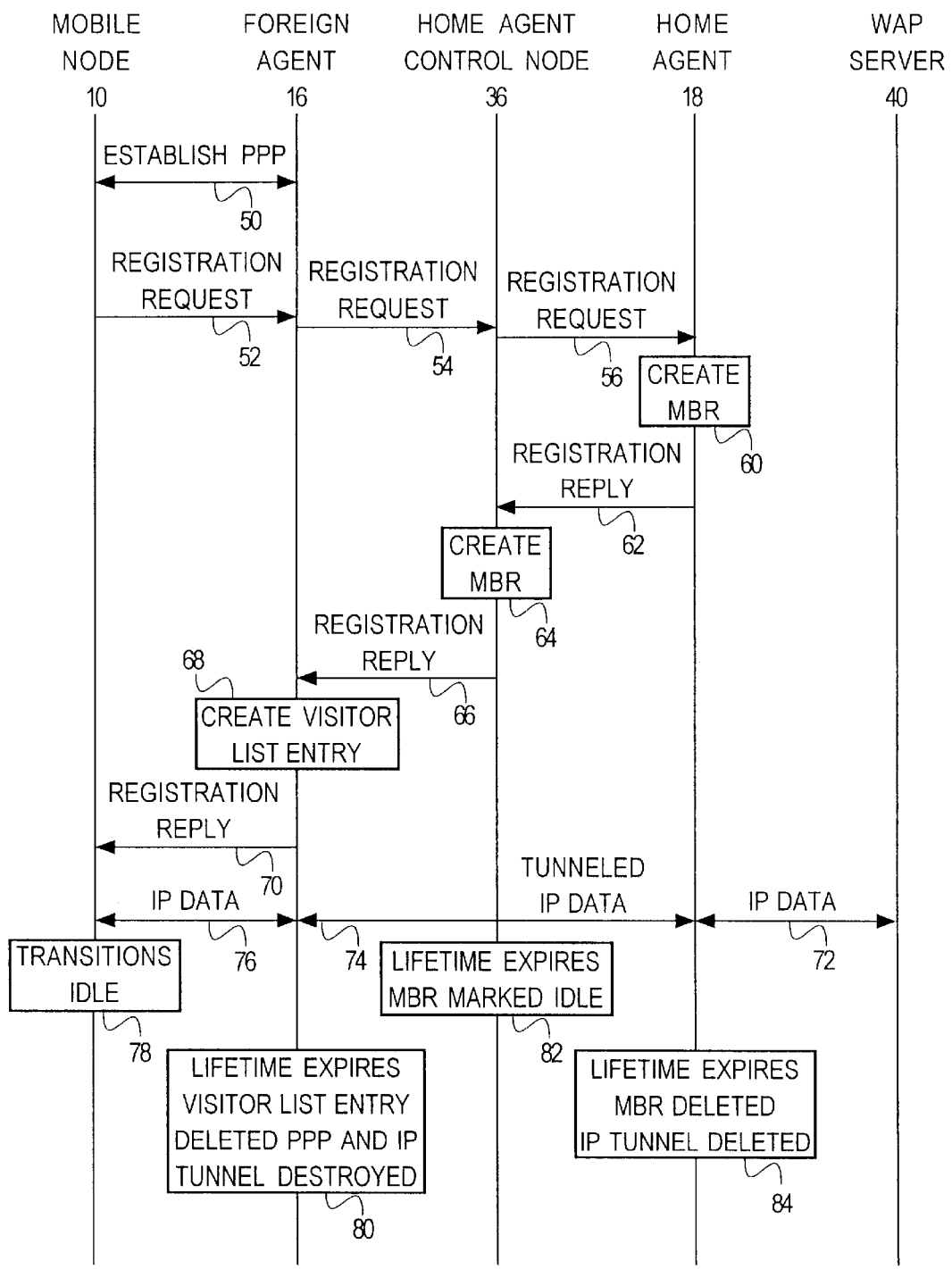
FIG. 3 is a diagram illustrating the flow of messages between the source of data, home agent, home agent control node, foreign agent and mobile node during a mobile Internet Protocol (IP) session, in which the mobile transitions to an idle state at the end of the session.
Figure 4:
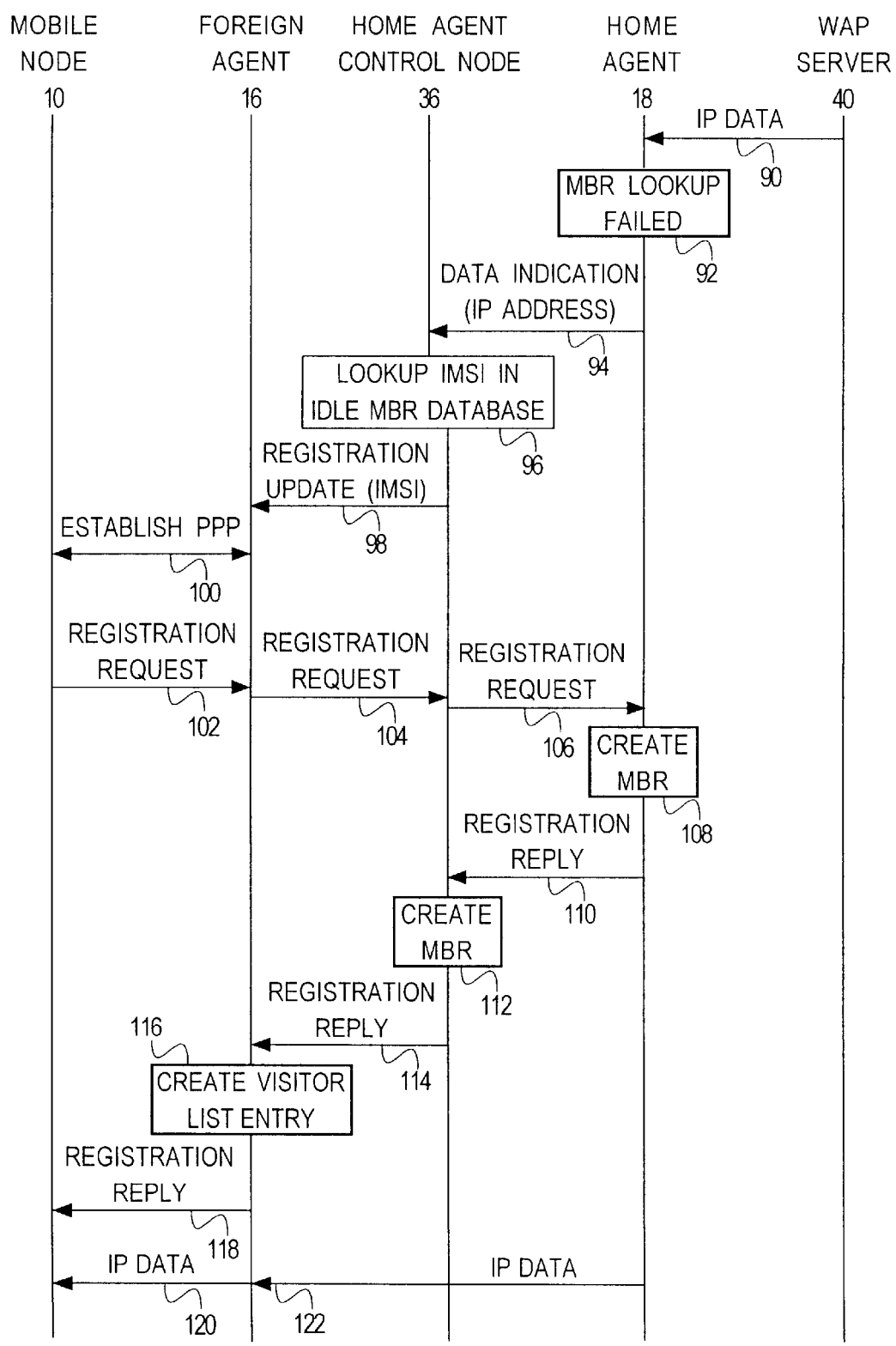
FIG. 4 is a diagram illustrates the flow of messages between the elements of the system of FIG. 2 implementing a push to idle mobile service in accordance with a presently preferred embodiment of the invention.

With reference now to FIGS. 3 and 4, a method will be describe by which WAP push service can be accomplished even when the mobile node is in an idle state. Before a mobile node can subscribe to any service, it has to register itself to its home network. This is done by the procedure shown in FIG. 3. After this registration has been performed, and the mobile node undergone a transition to an idle state, the procedure of FIG. 4 is then performed when the WAP server 40 has data to transmit to the idle mobile node.

Referring now to FIG. 3, the mobile node 10 initiates a PPP connection with a foreign agent 16, as indicated at 50. This action may occur, for example, when the mobile node places a call through the wireless network of FIG. 2 to is home network and the call is routed via the wireless network base station controller 32 to the foreign agent in that zone.

Once the PPP connection set up is complete, the mobile node performs mobile IP registration with the home agent control node 36 via the foreign agent 16. The mobile node sends a registration request message 52 to the foreign agent 16, and the foreign agent forwards the registration request message to the home agent control node 36 as indicated at step 54. The home agent control node 36 in turn forwards the registration request message to the home agent 18, indicated at 56. The home agent 18 performs authentication and registration tasks for the mobile node. Assuming registration is authorized, the home agent and mobile node negotiate a small lifetime value representing the amount of time the home agent will hold packets destined for the mobile node after it has transitioned to an idle state.

The home agent creates a mobility binding record (MBR) as indicated at step 60. This record will typically take the form of a table listing the mobile node's home network IP address, the IP address of the foreign agent, the mobile node's IMSI or ESN number, and the lifetime value. The home agent 18 sends a registration reply message 62 indicating registration was successful to the home agent control node 36, and the home agent control node creates a mobility binding record 64 similar to the one created by the home agent. The home agent control node 36 further sends the registration reply message to the foreign agent 16, indicated at step 66.

The foreign agent at step 68 creates a visitor list entry in a memory for the mobile node. The visitor list entry will contain information similar to the mobility binding record, and will include the IP address of the home agent and the home agent control node for the mobile node. The foreign agent then sends the registration reply message to the mobile node as indicated at step 70.

At this point, the procedures have been completed to allow an exchange of data from the WAP server 40 (or other source of data) to the mobile node using the tunneling procedures of mobile IP protocol. IP data is sent from the WAP server (step 72) to the home agent 18. The home agent encapsulates the data in accordance with mobile IP and tunnels the data to the foreign agent 16, indicated at 74. The foreign agent decapsulates the data and forwards it over the PPP link to the mobile node, indicate at step 76. Of course, the process also occurs in the reverse direction, in which IP data from the mobile node is tunneled from the foreign agent to the home agent for transmission to the WAP server 40.

After the data session is over, the mobile node disconnects from the foreign agent and transitions to an idle state, indicated at 78. After a predetermined period of time, the life timers for the mobile node expire at the foreign agent, the home agent control node and the home agent. In the foreign agent, the visitor list entry for the mobile node is deleted, the PPP link is disconnected, and the IP tunnel to the home agent is destroyed, as indicated at 80. The mobility binding record at the home agent control node is marked idle, as indicated at 82. Finally, the mobility binding record at the home agent is also deleted and the IP tunnel information to the foreign agent is also deleted.

Note that the home agent control node 36 maintains the mobility binding record, but simply marks it in an idle state. Some of the key data that will be maintained in the home agent control node in the idle mobility binding record database for the mobile node are:

(a) the home IP address of the mobile node (b) the user name of the mobile node (c) the IMSI number for the mobile node (d) the IP address of the IWU/foreign agent with which the mobile node last initiated a connection, such as the IP address of foreign agent 16 in FIG. 2.

This information will help in uniquely identifying a mobile node in the idle mobility binding record database. The user name is required to identify different user sessions that might have been initiated by the same mobile node.

Once the mobile node has undergone a transition to the idle state, it can still receive push data from the network as illustrated in the procedure of FIG. 4. At step 90, the WAP server 40 sends push data it received from some source on the home network to the home agent 18 that services the mobile node. As step 92, the home agent will look at its mobility binding record database and look for an entry for the mobile node (such as by the IMSI or ESN number of the mobile node and its home network IP address). Since the mobile node is idle in the present example, and it has deleted the mobility binding record for idle mobiles (see step 84 in FIG. 3), there is no mobility binding record for the mobile node.

Now, in accordance with a preferred embodiment of the invention, if the home agent or home agent control node knew the address of the last foreign agent with which the mobile node initiated a connection, the mobile could receive the push data in response to a page of the mobile node. This information is contained in the home agent control node in the preferred embodiment. Thus, at step 94, the home agent sends a data received indication message to the home agent control node, telling it in essence that the home agent has received WAP push data from the WAP server but does not have the tunnel information to tunnel it to the proper foreign agent. At step 96, then, the home agent control node will look up the idle mobile node in its mobility binding record database. It finds the IMSI of the mobile node and identifies the foreign agent with which the mobile node last initiated a PPP connection.

At step 98, the home agent sends a paging request to the foreign agent identified in step 96. Included in the paging request (registration update message) is the IMSI number of the mobile node. At step 100, the foreign agent sends a page message to the wireless network causing the mobile node to be paged. Assuming the mobile node is in a power on but idle state, it responds to the page and initiates a PPP connection with the foreign agent that paged it.

At step 102, the mobile node sends a registration request message to the foreign agent. Steps 102, 104 and 106 indicate the transmission of the registration request message to the home agent. At step 108, the home agent creates a mobility binding record for the home agent. Steps 110, 114 and 118 indicate the transmission of the registration reply message back to the mobile node. The home agent control node updates its mobility binding record for the mobile node (indicating that the mobile node is now active). At step 116, the foreign agent updates its visitor list to add the mobile node.

Since the registration process described in FIG. 4 includes the informing of the home agent and the home agent control node of the new location of the mobile node (and specifically the IP address of the foreign agent), it is now possible to transmit the push data from the home agent to the mobile node. This is indicated at step 122, showing the home agent tunneling the data to the foreign agent 16 and the step 120 in which the foreign agent forwards the data to the mobile node over the PPP link established at step 100 in FIG. 4.

FIG. 5 is an illustration of several records of a mobility binding database 130 for idle and active mobile nodes maintained by the home agent control node of FIG. 2 in the illustrated embodiment. The database is organized with a plurality of records 131. Each record includes fields for each mobile node that has been previously registered with the home agent. The fields include a field for the IMSI number of the mobile node 132, the mobile node's home network IP address 134, the IP address of the last IWU/foreign agent with which the mobile node last initiated a connection 136, the user name 138 used by the mobile node, and the status 140 of the mobile node. A status of active indicates that a PPP link between a foreign agent and the mobile node is currently in place and established. An idle state indicates that the there is no current PPP link between any foreign agent and the mobile node. Obviously, the entries in the mobility binding record database 130 of FIG. 5 will be updated as the mobile node moves in the wireless network into different packet zones and establishes new PPP connections with new foreign agents (such as the foreign agent 16A in FIG. 2), as new user name are used, and as the mobile node changes states between active and idle and back. In the case of multiple user sessions being registered for the same mobile node, the user name will identify which user session is being registered.

If the mobile node does not initiate a connection with the foreign agent within a certain timeout period after being paged (probably due to power off state), all queued IP packets at the home agent 16 will be dropped. The home agent 18 would only queue a specific number of packets from the WAP server in any event, and the rest of the packets would be dropped. The queued packets would arrive at the mobile node once it is registered due to Transmission Control Protocol (TCP) retransmits. The length of the queue at the home agent and the timeout interval for initiating a session could be made configurable.

Once data has been successfully pushed to the mobile node the mobile node could go back to an idle state. This would result in the deletion of the mobility binding record at the home agent 18 and the visitor list entry at the foreign agent 16. However, the home agent control node 36 would simply mark the entry for the mobile node idle, as shown in the right hand column of FIG. 5 for the first 3 records. The process of FIG. 4 would then repeat when the home agent 18 receives more push data from the WAP server.

To reduce the time it takes to page the mobile node, the mobile node should always register with the home agent control node 36 whenever it moves between packet zones (i.e., zones of the CDMA wireless network which are served by a single foreign agent), irrespective of whether the node is in an idle, dormant or active state. This will ensure that the foreign agent associated with the mobile node in the home agent control node mobility binding record database (column 136, FIG. 5) will be the one that will pick up the call-in when the mobile is paged. The idea is that the foreign agent that initiates the page should be the foreign agent for the packet zone in which the mobile node is currently located.

From the foregoing, it will be appreciated that we have described a method of forwarding data from a source of data (e.g., WAP server 40 or host computer on a network) to an idle mobile node, comprising the steps of:

a) forwarding data from the source to a home agent for the mobile node (step 90, FIG. 4);

b) identifying a foreign agent with which said mobile node last initiated a connection (step 96 in FIG. 4, column 136 in the mobility binding record of FIG. 5);

c) transmitting a page request to said foreign agent (step 98 in FIG. 4), with the foreign agent responsively initiating a page of the mobile node, the mobile node responding to the page, thereby changing from an idle state to an active state;

d) transmitting an address associated with the foreign agent to said home agent (part of the registration request message 106 in FIG. 4); and e) forwarding data from the home agent to said foreign agent for transmission to said mobile node (step 122 in FIG. 4).

Preferably, the step of identifying the foreign agent is performed in a home agent control node by reference to a mobility binding record database such as shown in FIG. 5. The database is used to associate unique information identifying the mobile node (such as the IMSI number, or alternatively ESN number or other information) with the foreign agent with which the mobile node last initiated a Point-to-Point Protocol connection. The unique information identifying the mobile node may further include a home network Internet Protocol (IP) address, and a user name, as shown in FIG. 5.

The home agent control node 36 may comprise a general purpose computing device or a outer functioning as a home registration agent.

In another aspect, we have also described a home agent control node 36 cooperating with a home agent 18 and a foreign agent 16 to provide a push to idle mobiles service. The home agent control node comprises a telecommunications device such as a general-purpose computer or router having a central processing unit, at least one interface to a packet switched network and a memory. The memory stores a mobility binding record for idle mobile nodes, such as shown in FIG. 5. The home agent control node, upon receipt of a received data indication message from the home agent (step 94 in FIG. 4, indicating that a source of data, e.g., WAP server, has transmitted data to the home agent for receipt by an idle mobile node), responsively refers to the mobility binding record database to identify a foreign agent with which the idle mobile node last initiated a connection. The home agent control node sends a paging request message to the foreign agent (step 98, FIG. 4), to cause the foreign agent to page the mobile node. The mobile node establishes a connection with the foreign agent and thereafter receives the data from WAP server via the home agent and foreign agent, as indicated in Steps 120 and 122 in FIG. 4)

In one possible embodiment, the home agent control node memory also stores a software program for processing registration requests for mobile nodes. In this embodiment, the home agent control node functions as a home registration agent and the home agent 18 functions as a home tunneling agent.

In another aspect, a computer-readable storage medium (such as a RAM memory) is provided in a communication device, such as a home agent or home agent control node storing a mobility binding record database for multiple mobile nodes that undergo a transition to an idle state. The database, such as the database shown in FIG. 5, includes a plurality of records 131 associated with a plurality of idle mobile nodes, each of said records-comprising (1) information uniquely identifying a idle mobile node, such as the mobile node's IMSI number; (2) a home Internet Protocol (IP) address for the idle mobile node; and (3) an address of a foreign agent with which the idle mobile node was last connected. The computer-readable storage medium further comprises a user name for the mobile node in a preferred embodiment. The mobility binding record database is used in the procedure illustrated in FIG. 4 to enable WAP push service to idle mobile nodes in the manner described herein.

While the preceding description uses the home agent 18 for the processing of the registration request message, this functionality could be performed in the home agent control node 36, with the home agent 16 simply implementing the function of the home tunneling agent. In this case, after the home agent control node registers the mobile node it sends the information for the home agent 16's mobility binding record to the home agent 16 so that the home agent knows where to tunnel the WAP push data.

Persons skilled in the art will appreciate that various modifications and alterations from the presently preferred embodiment can be made without departure from the true scope and spirit of the invention. This true scope and spirit is defined by the appended claims, to be interpreted in light of the foregoing.

We claim:

1. A method of forwarding data from a source of said data to an idle mobile node, comprising the steps of:

forwarding said data from said source of said data to a home agent for said mobile node; wherein a current foreign agent serving said mobile node is not known due to said mobile node being in an idle state;

storing a mobility binding record for idle mobile nodes;

identifying from said mobility binding record a foreign agent with which said mobile node last initiated a connection;

transmitting a page request to said identified foreign agent, said identified foreign agent responsively initiating a page of said mobile node, said mobile node responding to said page and registering with said identified foreign agent, thereby changing from an idle state to an active state;

transmitting an address associated with said identified foreign agent to said home agent; and forwarding said data from said home agent to said identified foreign agent for transmission to said mobile node.

2. The method of claim 1, wherein said step of identifying a foreign agent is performed in a home agent control node by reference to a mobility binding record database containing entries for idle mobile nodes.

3. The method of claim 2, wherein said idle mobility binding record database associates unique information identifying said mobile node with said foreign agent with which said mobile node last initiated a Point-to-Point Protocol connection.

4. The method of claim 3, wherein said unique information identifying said mobile node comprises an International Mobile Subscriber Identity (IMSI) number.

5. The method of claim 4, wherein said unique information identifying said mobile node further comprises a home Internet Protocol (IP) address, and a user name.

6. The method of claim 2, wherein said home agent control node comprises a device functioning as a home registration agent.

7. A home agent control node cooperating with a home agent and a foreign agent to provide a push to idle mobiles service, the home agent control node comprising:

a telecommunications device having a central processing unit, at least one interface to a packet switched network and a memory, said memory storing a mobility binding record for idle mobile nodes;

wherein said home agent control node, upon receipt of a message from said home agent indicating that a source of data has transmitted data to said home agent for receipt by an idle mobile node, responsively refers to said mobility binding record for idle mobile nodes to identify a foreign agent with which said idle mobile node last initiated a connection;

said home agent control node further responsive to said message to send a paging request message to said identified foreign agent to cause said foreign agent to page said mobile node, whereby said mobile node may establish a connection with said foreign agent and receive said data from said source of data tunneled to said foreign agent by said home agent.

8. The home agent control node of claim 7, wherein said memory further stores a software program for processing registration requests for mobile nodes.

9. The home agent of claim 7, wherein said idle mobility binding record database associates unique information identifying said idle mobile node with said foreign agent with which said mobile node last initiated a connection.

10. The home agent control node of claim 9, wherein said unique information identifying said mobile node comprises an International Mobile Subscriber Identity (IMSI) number.

11. The home agent control node of claim 10, wherein said unique information identifying said mobile node further comprises a home Internet Protocol (IP) address and a user name.

12. A computer-readable storage medium storing a mobility binding record database for multiple mobile nodes that undergo a transition to an idle state, comprising:

a plurality of records associated with a plurality of idle mobile nodes, each of said records comprising (1) information uniquely identifying a idle mobile node; (2) a home Internet Protocol (IP) address for said idle mobile node; and (3) an address of a foreign agent with which said idle mobile node was last connected.

13. The computer-readable storage medium of claim 12, wherein at least one of said records further comprises a user name.

14. The computer-readable storage medium of claim 12, wherein said computer readable storage medium is incorporated into a communications device functioning as a home agent control node.

15. The computer-readable storage medium of claim 12, wherein said information uniquely identifying said mobile node comprises an International Mobile Subscriber Identity (IMSI) number.

\* \* \* \* \*